United States Patent
Back

(10) Patent No.: US 7,360,890 B2
(45) Date of Patent: Apr. 22, 2008

(54) CONTACT LENSES AND METHODS FOR REDUCING CONJUNCTIVAL PRESSURE IN CONTACT LENS WEARERS

(75) Inventor: Arthur Back, Danville, CA (US)

(73) Assignee: Coopervision, Inc, New York, NY (US)

(*) Notice: Subject to any disclaimer, the term of this patent is extended or adjusted under 35 U.S.C. 154(b) by 0 days.

(21) Appl. No.: 11/500,178

(22) Filed: Aug. 7, 2006

(65) Prior Publication Data
US 2007/0035693 A1    Feb. 15, 2007

Related U.S. Application Data

(60) Provisional application No. 60/707,614, filed on Aug. 11, 2005.

(51) Int. Cl.
*G02C 7/04* (2006.01)

(52) U.S. Cl. .................. 351/160 R; 351/177

(58) Field of Classification Search . 351/160 R–160 H
See application file for complete search history.

(56) References Cited

U.S. PATENT DOCUMENTS

| | | | |
|---|---|---|---|
| 3,808,178 A | 4/1974 | Gaylord | |
| 4,120,570 A | 10/1978 | Gaylord | |
| 4,136,250 A | 1/1979 | Mueller et al. | |
| 4,153,641 A | 5/1979 | Deichert et al. | |
| 4,190,277 A | 2/1980 | England | |
| 4,740,533 A | 4/1988 | Su et al. | |
| 5,034,461 A | 7/1991 | Lai et al. | |
| 5,070,215 A | 12/1991 | Bambury et al. | |
| 6,010,219 A | 1/2000 | Stoyan | |
| 6,044,742 A * | 4/2000 | Sakamoto et al. | ......... 351/161 |
| 6,867,245 B2 | 3/2005 | Iwata et al. | |
| 2002/0101563 A1 | 8/2002 | Miyamura et al. | |
| 2005/0088614 A1 | 4/2005 | Jubin et al. | |
| 2005/0146679 A1 | 7/2005 | Marmo et al. | |

FOREIGN PATENT DOCUMENTS

| | | |
|---|---|---|
| EP | 080539 | 7/1983 |
| EP | 1 233 297 | 8/2002 |
| EP | 1 496 388 | 1/2005 |

(Continued)

OTHER PUBLICATIONS

Andre et al., "A New Approach to Fitting Soft Contact Lenses", Eyewitness Second Quarter 2001, Feature article sponsored by CooperVision.

(Continued)

*Primary Examiner*—Scott J. Sugarman
*Assistant Examiner*—Darryl J. Collins
(74) *Attorney, Agent, or Firm*—Stout, Uxa, Buyan & Mullins, LLP; Frank J. Uxa; Greg S. Hollrigel

(57) ABSTRACT

Contact lenses, such as silicone hydrogel contact lenses, which are effective in reducing conjunctival pressure, and conjunctival epithelial flap formation or occurrence of a lens wearer's eye, and methods of reducing conjunctival pressure by a contact lens and/or formation of conjunctival epithelial flap formation are described. The present contact lenses reduce the interaction and/or pressure of the contact lens, or portion thereof, with or on the conjunctiva of a lens wearer's eye.

30 Claims, 6 Drawing Sheets

FOREIGN PATENT DOCUMENTS

| | | |
|---|---|---|
| GB | 2 327 283 | 1/1999 |
| WO | WO 01/75509 | 10/2001 |
| WO | WO 2004/097502 | 11/2004 |

OTHER PUBLICATIONS

Løfstrøm et al., "A Conjunctival Response to Silicone Hydrogel Lens Wear", Contact Lens Spectrum/Month 2005, www.clspectrum.com.

Løfstrøm et al., Synoptik R&D Clinic, Copenhagen, Denmark, "A New Conjunctival Response to Silicone Hydrogel Lenses", Article Flap/Feb. 7, 2005.

Loretta B. Szczotka OD, MS, FAAO, "Computerised corneal typography applications in RGP contact lens fitting," Feb. 22, 2002 OT, www.optometry.co.uk.

\* cited by examiner

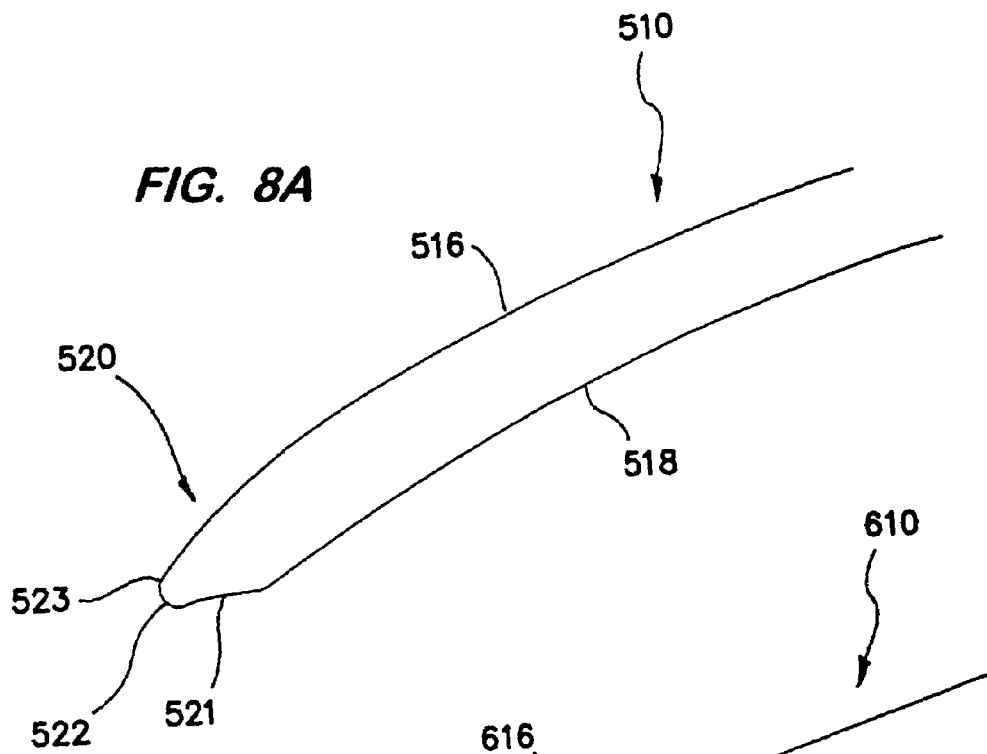
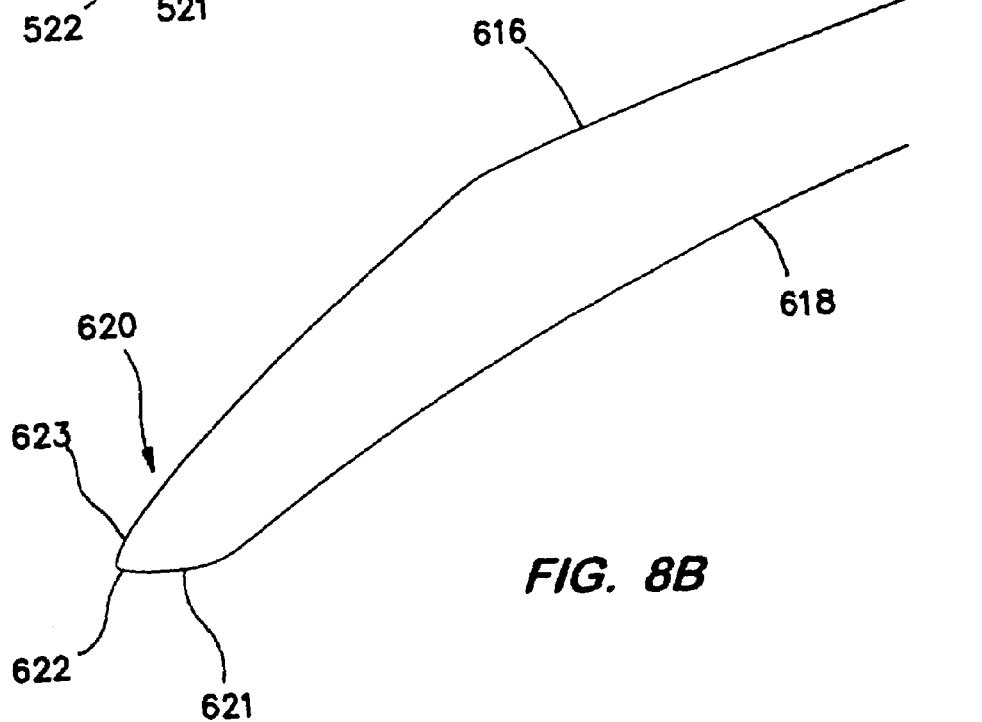

CONTACT LENSES AND METHODS FOR REDUCING CONJUNCTIVAL PRESSURE IN CONTACT LENS WEARERS

CROSS-REFERENCE TO RELATED APPLICATIONS

This application claims the benefit of U.S. Provisional Application No. 60/707,614, filed Aug. 11, 2005, the entire contents of which are hereby incorporated by reference.

FIELD OF THE INVENTION

The present invention relates to contact lenses. More particularly, the invention relates to contact lenses and methods which provide for a reduction in conjunctival pressure, and/or a reduction in conjunctival epithelial flap formation or occurrence.

BACKGROUND

Silicone hydrogel contact lenses have become popular due to the ability of contact lens wearers to wear such lenses in their eyes for longer times compared to non-silicone hydrogel contact lenses. The extended time of wearing silicone hydrogel contact lenses is likely related to the high oxygen permeability (Dk) or oxygen transmissability (Dk/t) of the silicone hydrogel lens materials.

Examples of silicone hydrogel contact lenses are available from Johnson & Johnson under the tradenames Acuvue Advance and Acuvue Oasys, from Ciba Vision under the tradename Focus Night and Day, and from Bausch & Lomb under the tradename PureVision. The Acuvue Advance has the United States Adopted Name (USAN) Galyfilcon A, the Focus Night and Day lens has the USAN Lotrafilcon A, and the PureVision lens has the USAN Balafilcon A. Additional examples of suitable materials used to make silicone hydrogel contact lenses include, without limitation, senofilcon A, and lotrafilcon B.

Although existing silicone hydrogel contact lenses provide several benefits, wearing existing silicone hydrogel contact lenses can be associated with problems. For example, patients who sleep with silicone hydrogel contact lenses on their eyes are more likely to develop severe keratitis (microbial keratitis) compared to patients who don't sleep with such lenses. Other problems associated with existing silicone hydrogel contact lenses include adverse corneal responses and adverse lid responses. In addition, contact lens-induced conjunctival staining (CLICS) in regions outside of the limbus are commonly observed with silicone hydrogel contact lenses. CLICS may be observed more frequently with silicone hydrogel contact lenses that have a knife-point edge as compared to a rounded lens edge.

Silicone hydrogel contact lenses have an increased rigidity or stiffness compared to conventional hydrogel contact lenses, such as poly(2-hydroxyethyl methacrylate) (poly-HEMA) containing lenses. Thus, silicone hydrogel contact lenses are less able to conform to the shape of the eye, which can result in discomfort for the patient wearing the lenses. The material properties of existing silicone hydrogel contact lenses can induce greater mechanical interaction with the cornea and conjunctival tissues compared to the non-silicone hydrogel contact lenses. The mechanical properties of silicone hydrogel contact lenses may also be associated with papillary conjunctivitis and superior epithelial splits.

Furthermore, the interaction of existing silicone hydrogel contact lenses and bulbar conjunctival tissue of a lens wearer can be significantly increased relative to non-silicone hydrogel contact lenses. This interaction can result in increased discomfort for the lens wearer and increased dilation of the blood vessels of the bulbar conjunctiva leading to an increased redness appearance of the eye of the wearer.

As discussed in U.S. Patent Publication No. 2005/0088614, corneal staining can be associated with contact lens wear. In this document, contact lenses are described which attempt to reduce peak pressure on the cornea.

Thus, there remains a need for new contact lenses, such as silicone hydrogel contact lenses, that provide improved patient comfort and that are not associated with the problems associated with existing silicone hydrogel contact lenses.

SUMMARY

The present lenses and methods attempt to address this and other needs. The present lenses and methods provide enhanced oxygen permeability relative to polyHEMA contact lenses and provide enhancements in patient comfort and conjunctival health. Contact lenses, such as silicone hydrogel contact lenses, which are effective in reducing conjunctival pressure on a lens wearer's eye, and methods of reducing conjunctival pressure are described. The present contact lenses reduce the interaction and/or pressure of the contact lens, or portion thereof, with or on the conjunctiva of a lens wearer's eye. Thus, the present lenses and methods may be effective in reducing the formation and/or occurrence of conjunctival epithelial flaps produced by wearing contact lenses.

Various embodiments of the present invention are described in detail in the detailed description below.

Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention. Additional advantages and aspects of the present invention are apparent in the following detailed description, drawings, and additional disclosure.

BRIEF DESCRIPTION OF THE DRAWINGS

FIG. 8A is an illustration of a sectional view of an embodiment of the present contact lenses having a localized increase in posterior edge lift compared to existing silicone hydrogel contact lenses.

FIG. 8B is an illustration of a sectional view of another embodiment of the present invention similar to the embodiment shown in FIG. 8A.

DETAILED DESCRIPTION

Figure 1:
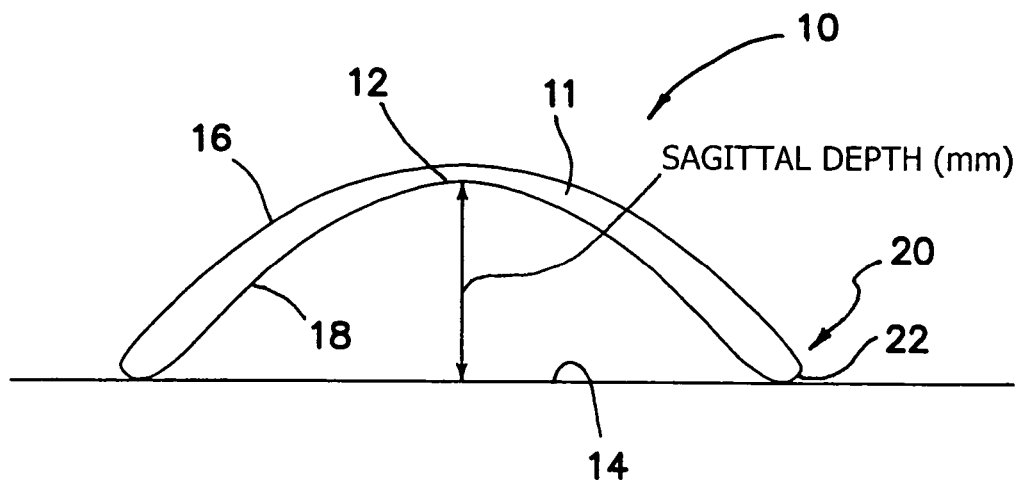
FIG. 1 is an illustration of a sectional view of a contact lens on a flat surface showing the sagittal depth.

It has been discovered that wearing currently available silicone hydrogel contact lenses, such as contact lenses formed from balafilcon A or lotrafilcon A, is associated with the formation or observation of conjunctival epithelial flaps (or conjunctival flaps). Conjunctival epithelial flaps have not previously been observed or reported. Surprisingly, wearing existing silicone hydrogel contact lenses on a daily basis or overnight basis is frequently associated with the observance of conjunctival epithelial flaps. This observation was surprising since such flaps are not observed under routine examinations employing white light. Because of the nature of silicone hydrogel materials, lens fitting, edge shape, and other parameters of such contact lenses are important factors in determining clinical performance of silicone hydrogel contact lenses.

It is well known that the lens and cornea must have an appropriate fitting relationship to minimize their interaction. The cornea typically flattens in curvature towards the periphery and can be modeled by a conic section profile. Furthermore, the conjunctival curvature is flatter than the peripheral cornea with the junction between the cornea and conjunctiva, the limbus, having several transition profiles. This interaction can also result in damage to the conjunctival epithelium of the wearer as evidenced by fluorescein staining of the conjunctival epithelial cells in and around the area of the conjunctiva over which the edge of the silicone hydrogel contact lens interacts. Often, when the pressure of an existing silicone hydrogel contact lens on the conjunctiva is greater than optimal, an indentation of the conjunctival tissue by the lens can be observed after the installation of sodium fluorescein into the eye with subsequent pooling of the dye in the indented region.

Table 1 shows the results of studies regarding conjunctival flap occurrence in people wearing existing silicone hydrogel contact lenses.

TABLE 1

Conjunctival flap by lens type

| | All Lenses | Balafilcon A | Lotrafilcon A | | |
|---|---|---|---|---|---|
| Modulus (MPa) | | 1.3 | 1.4 | | |
| Lens Edge Shape | | Round | Chisel | | |
| Base Curve | | One | Steep and flat | Steep only | Flat only |
| Total eyes | 32 | 14 | 18 | 6 | 12 |
| Eyes with no flap | 21 | 13 | 8 | 2 | 6 |
| Eyes with flap | 11 | 1 | 10 | 4 | 6 |
| Eyes with flap (%) | 34 | 8 | 56 | 67 | 50 |

Using high magnification, fluorescein dye, a yellow filter, and cobalt blue light, conjunctival epithelial flaps are seen to occur in a substantial number of silicone hydrogel contact lens wearers. Conjunctival flaps were typically observed in one or more regions about 1 mm beyond the limbus, in the area adjacent to the lens edge. Conjunctival flaps had uneven margins and were able to be manipulated and moved using the eyelid margin. Conjunctival flaps were observed in the inferior quadrant, the superior quadrant, and a combination thereof. Of the observed eyes, conjunctival flaps could vary in length and or width of the flap tissue. Conjunctival flaps were not observed in the nasal or temporal areas. In addition, conjunctival flaps were either observed by themselves, or were observed in combination with conjunctival staining and/or indentation. Conjunctival flaps that originated from a raised ridge of epithelium were observed. While not wishing to be bound by any particular theory or mechanism of action, it is believed that the epithelial ridge is hyperplastic conjunctival epithelium. Fluorescein penetration into the conjunctival flap or into the underlying tissue was not observed.

The occurrence of conjunctival flaps may be related to lens designs, lens materials, and combinations thereof. While not wishing to be bound by any particular theory or mechanism of action, conjunctival flap formation may be related to the shape of the lens edge, the modulus of the contact lens, the base curve of the contact lens, and/or combinations thereof. For example, silicone hydrogel contact lenses typically have a higher modulus than traditional hydrogel contact lenses, such as HEMA-based lenses. For example, the silicone hydrogel contact lenses described in Table 1 have moduli of 1.3 MPa and 1.4 MPa. Formation of conjunctival flaps may be associated with silicone hydrogel contact lenses having a higher modulus since such lenses may not be able to conform to the shape of the eye compared to contact lenses having a lower modulus. In addition, the presence of non-rounded edge shapes, such as knife point edges, may be associated with increased edge interaction of the lenses, and conjunctival flap formation. In addition, steeper base curves may be associated with an increased prevalence of conjunctival flaps. Some specific mechanisms can be proposed for the new observation of conjunctival flaps with existing silicone hydrogel contact lens wear. For example, chisel-shaped lens edges or knife-point lens edges may carve into the superficial conjunctival tissue, which may be facilitated by lens binding during eye closure and subsequent movement upon eye opening. In addition, or alternatively, irritation caused by the lens edge of silicone hydrogel contact lenses on the conjunctival epithelial tissue may increase conjunctival epithelial cell production and/or may redistribute the epithelial cells. In addition or alternatively, conjunctival irritation may result in conjunctival chemosis or swelling. This swelling may cause the lens edge to become superficially embedded in the swollen conjunctival tissue area.

Contact lenses have been invented that reduce the interaction or pressure of the lens on or near the limbal or bulbar conjunctiva of the wearer. The present contact lenses are more comfortable to the wearer and reduce the redness appearance of the eye of the wearer. The present contact lenses are effective in reducing the formation and/or observation of conjunctival flaps that are seen in people who wear silicone hydrogel contact lenses.

The present contact lenses are made from materials that have one or more properties similar to silicone hydrogel contact lenses. For example, the present lenses may have a high oxygen permeability, a high oxygen transmissibility, a high modulus, and/or a high water content. As used herein, a silicone hydrogel contact lens is a contact lens that has a high oxygen permeability and an ophthalmically acceptable water content. Silicone hydrogel contact lenses can be understood to be contact lenses that comprise a silicone hydrogel material. For example, silicone hydrogel contact lenses can comprise one or more hydrophilic silicon-containing macromers, polymers, and the like. Thus, in certain embodiments, the present lenses are silicone hydrogel contact lenses.

Thus, the present lenses may be understood to comprise one or more silicon-containing components, and one or more hydrophilic components.

A silicone-containing component is one that contains at least one [—Si—O—Si] group, in a monomer, macromer or prepolymer. The Si and attached O may be present in the silicone-containing component in an amount greater than 20 weight percent, for example greater than 30 weight percent of the total molecular weight of the silicone-containing component. Useful silicone-containing components comprise polymerizable functional groups such as acrylate, methacrylate, acrylamide, methacrylamide, N-vinyl lactam, N-vinylamide, and styryl functional groups. Examples of some silicone-containing components which are useful in the present lenses may be found in U.S. Pat. Nos. 3,808,178; 4,120,570; 4,136,250; 4,153,641; 4,740,533; 5,034,461 and 5,070,215, and EP080539.

Further examples of suitable silicone-containing monomers are polysiloxanylalkyl(meth)acrylic monomers including, without limitation, methacryloxypropyl tris(trimethylsiloxy) silane, pentamethyldisiloxanyl methylmethacrylate, and methyldi(trimethylsiloxy)methacryloxymethyl silane.

One useful class of silicone-containing components is a poly(organosiloxane) prepolymer such as α, ω-bismethacryloxyp-ropyl polydimethylsiloxane. Another example is mPDMS (monomethacryloxypropyl terminated mono-n-butyl terminated polydimethylsiloxane). Another useful class of silicone containing components includes silicone-containing vinyl carbonate or vinyl carbamate monomers including, without limitation, 1,3-bis[4-(vinyloxycarb-onyloxy)but-1-yl]tetramethyldisiloxane 3-(vinyloxycarbonylthio)propyl-[tris(trimethylsiloxysilane]; 3-[tris(trimethylsiloxy)silyl] propyl allyl carbamate; 3-[tris(trimethylsiloxy)wilyl] propyl vinyl carbamate; trimethylsilylethyl vinyl carbonate; and trimethylsilylmethyl vinyl carbonate. An example of suitable materials include agents represented by the following formula:

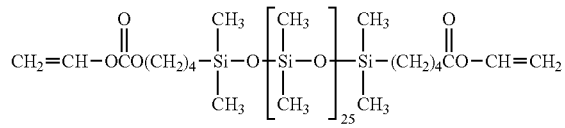

Another example of suitable materials include agents represented by the following formula:

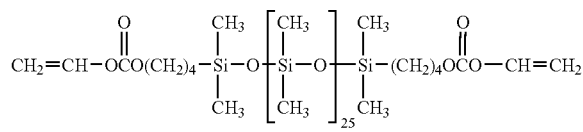

Another example of suitable materials include agents represented by the following formula, herein designated M3U:

poly (ω-methoxy-poly(ethyleneglycol) propylmethylsiloxane); or a dimethacryloyl silicone-containing macromer.

Another example of suitable materials include agents represented by the following formula, herein designated FM0411M:

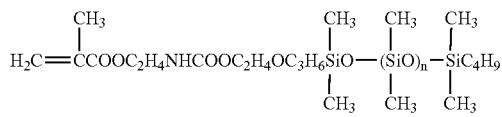

where n=13-16, and the Mw is 1500. FM0411M can also be referred to as FM-0411M; or a-Methacryloyloxyethy iminocarboxyethyloxypropyl-poly(dimethylsiloxy)-butyldimethylsilane.

Some embodiments of the present silicone hydrogel lenses can be made from comfilcon A (CooperVision, Inc.).

Hydrophilic components include those which are capable of providing at least about 20%, for example, at least about 25% water content to the resulting lens when combined with the remaining reactive components. Suitable hydrophilic components may be present in amounts between about 10 to about 60 weight % based upon the weight of all reactive components. About 15 to about 50 weight %, for example, between about 20 to about 40 weight %. Hydrophilic monomers that may be used to make the polymers for the present lenses have at least one polymerizable double bond and at least one hydrophilic functional group. Examples of polymerizable double bonds include acrylic, methacrylic, acrylamido, methacrylamido, fumaric, maleic, styryl, isoprope-nylphenyl, O-vinylcarbonate, O-vinylcarbamate, allylic, O-vinylacetyl and N-vinyllactam and N-vinylamido double bonds. Such hydrophilic monomers may themselves be used as crosslinking agents. "Acrylic-type" or "acrylic-containing" monomers are those monomers containing the acrylic group (CR'H═CRCOX) wherein R is H or CH₃, R' is H, alkyl or carbonyl, and X is O or N, which are also known to polymerize readily, such as N,N-dimethylacrylamide (DMA), 2-hydroxyethyl acrylate, glycerol methacrylate, 2-hydroxyethyl methacrylamide, polyethyleneglycol monomethacrylate, methacrylic acid, acrylic acid and mixtures thereof.

Hydrophilic vinyl-containing monomers which may be incorporated into the materials of the present lenses may include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, N-vinyl formamide, $N^2$-hydroxyethyl vinyl carbamate, N-carboxy-

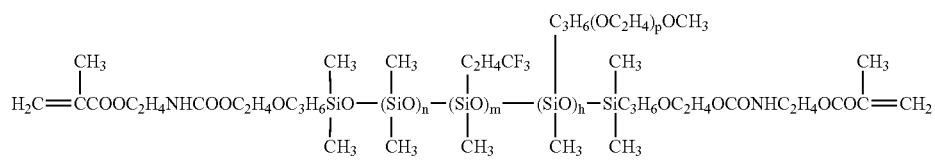

where n is 121, m is 7.6, h is 4.4, and the Mn=12,800, and the Mw=16,200. M3U can also be referred to as α-ω-Bis (methacryloyloxyethyl iminocarboxy ethyloxypropyl)-poly (dimethylsiloxane)-poly (trifluoropropylmethylsiloxane)-

β-alanine N-vinyl ester. In one embodiment, the hydrophilic vinyl-containing monomer is NVP.

Other hydrophilic monomers that can be employed in the present lenses include polyoxyethylene polyols having one or more of the terminal hydroxyl groups replaced with a functional group containing a polymerizable double bond. Examples include polyethylene glycol with one or more of the terminal hydroxyl groups replaced with a functional group containing a polymerizable double bond. Examples include polyethylene glycol reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Additional examples are the hydrophilic vinyl carbonate or vinyl carbamate monomers disclosed in U.S. Pat. No. 5,070,215, and the hydrophilic oxazolone monomers disclosed in U.S. Pat. No. 4,190,277. Other suitable hydrophilic monomers will be apparent to one skilled in the art. More preferred hydrophilic monomers which may be incorporated into the polymer of the present invention include hydrophilic monomers such as N,N-dimethyl acrylamide (DMA), 2-hydroxyethyl acrylate, glycerol methacrylate, 2-hydroxyethyl methacrylamide, N-vinylpyrrolidone (NVP), and polyethyleneglycol monomethacrylate. In certain embodiments, hydrophilic monomers including DMA, NVP and mixtures thereof are employed.

Additional examples of materials used to make silicone hydrogel contact lenses include those materials disclosed in U.S. Pat. No. 6,867,245.

The present contact lenses which reduce conjunctival flap formation or occurrence may have different material properties, including without limitation, static and dynamic properties, such as Young's modulus, elastic properties, recovery from deformation and surface wetting properties such as friction and lubricity, compared to existing silicone hydrogel contact lenses, including the lenses described in Table 1.

While it has been observed that the rounding of the lens edge of contact lenses decreases the interaction of the lens with the conjunctival tissue by providing a smoother passage of the lens over the tissue, this interaction may not be reduced sufficiently to eliminate the presence of conjunctival epithelial cell damage, redness, indentation or the production of conjunctival epithelial cell flaps. In addition, due to manufacturing restrictions or other reasons, it may not be possible to produce a lens with sufficient rounding of the edge or any rounding at all, to reduce the formation or occurrence of conjunctival flaps. Likewise the unique material properties of silicone hydrogels may also restrict the options available to reduce the pressure on the conjunctiva. Therefore other or additional methods and structural features may be required to eliminate this pressure, such as conjunctival pressure, and its consequences.

Figure 2:
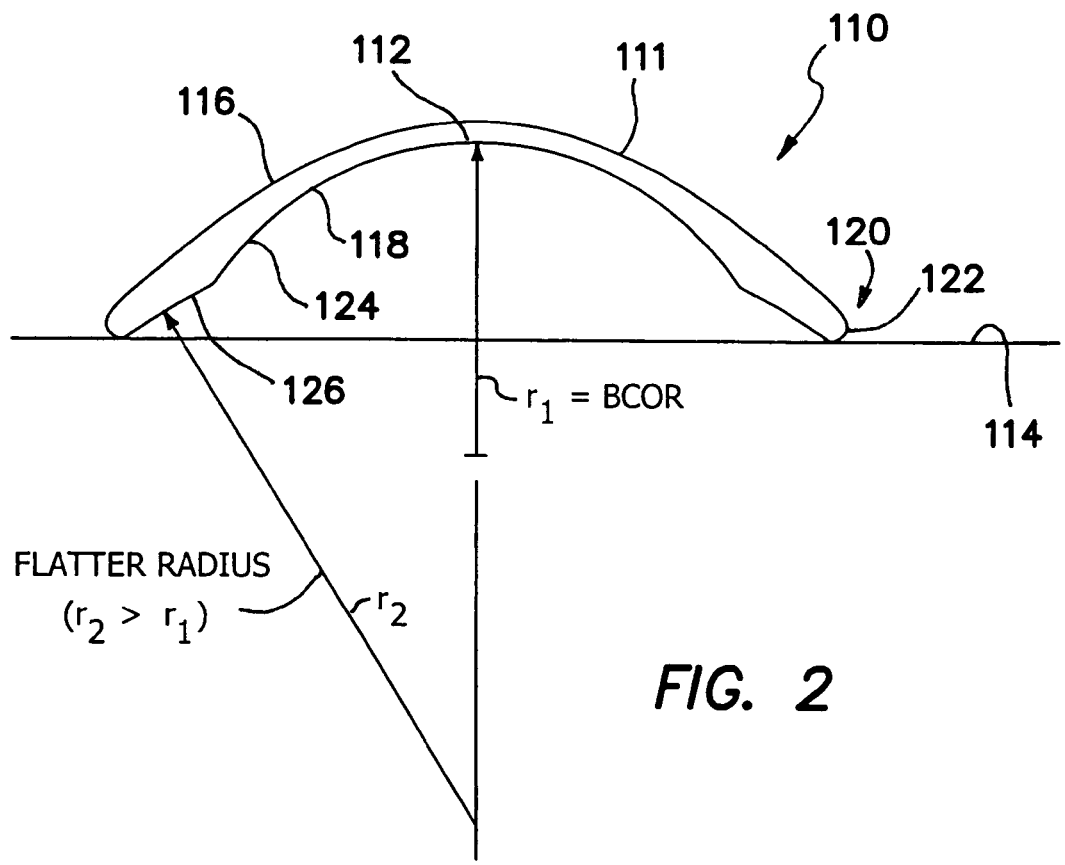
FIG. 2 is an illustration of a sectional view of a contact lens comprising a bicurve posterior surface.
Figure 3:
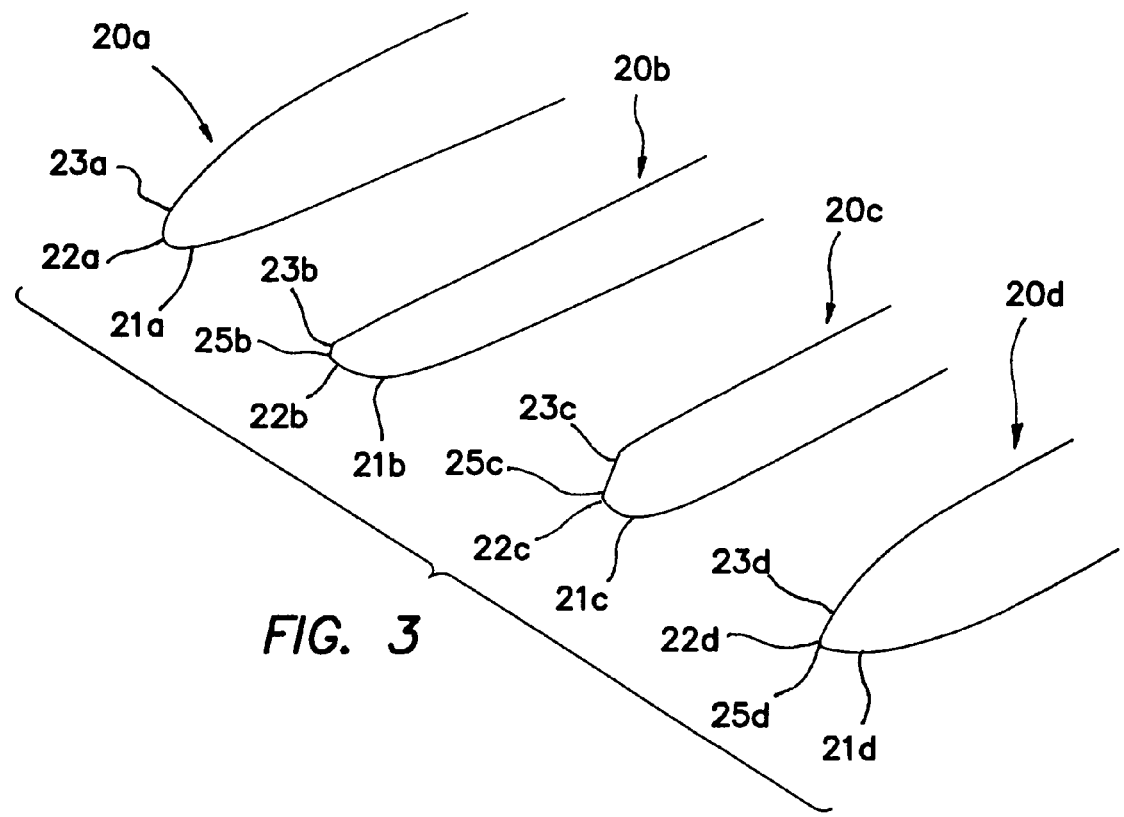
FIG. 3 is an illustration of sectional views of four contact lens edges having a rounded edge surface.
Figure 6:
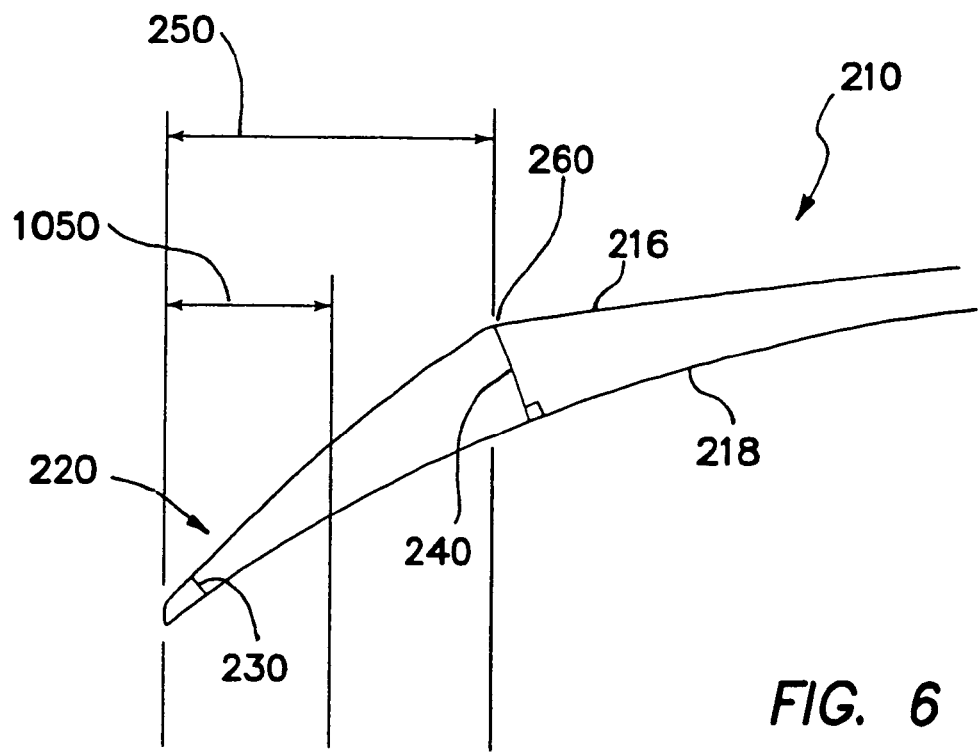
FIG. 6 is an illustration of one embodiment of the present contact lenses having a reduced peripheral stiffness compared to the lens of FIG. 5.
Figure 7A:
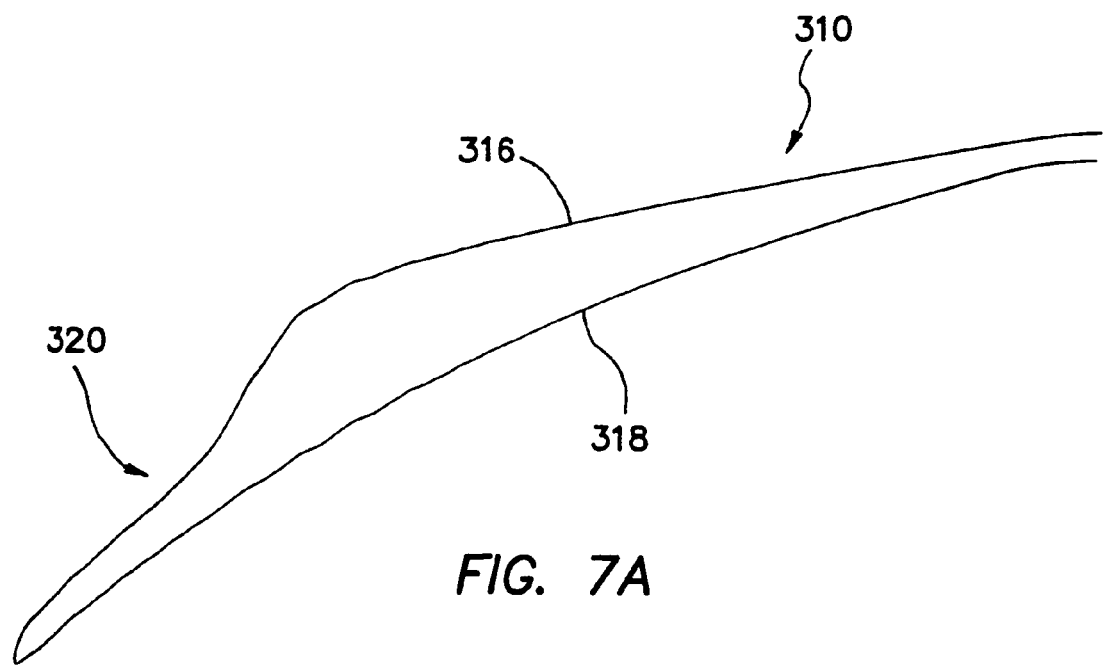
FIG. 7A is an illustration of a sectional view of one embodiment of the present contact lenses having a slower peripheral edge taper compared to existing silicone hydrogel contact lenses.
Figure 7B:
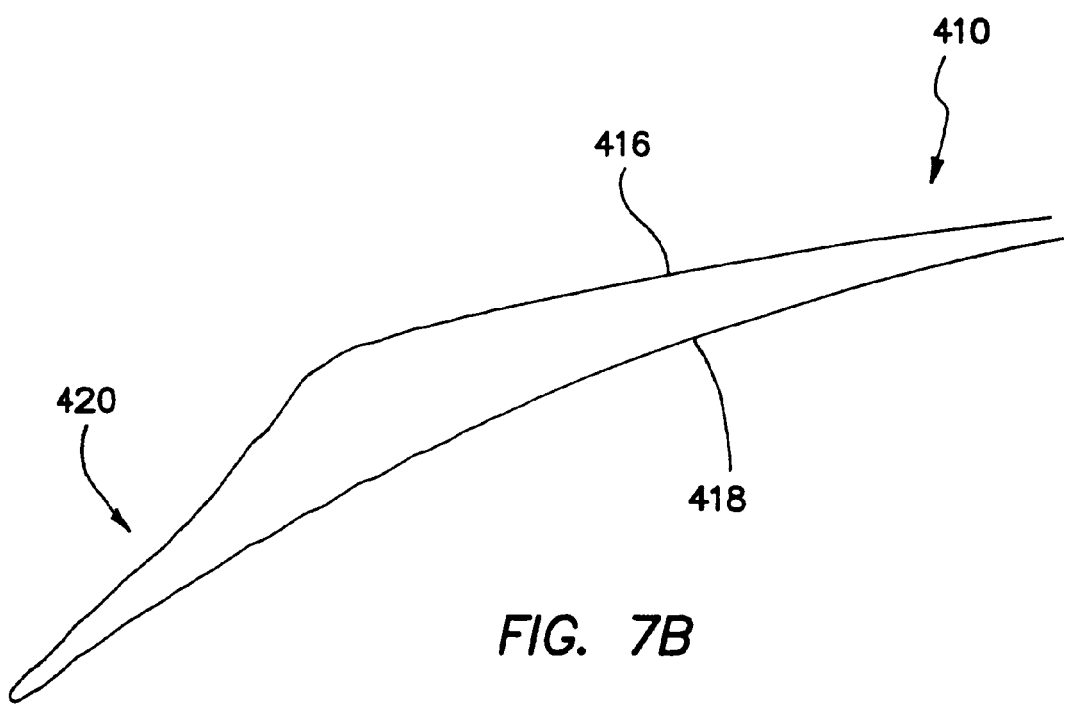
FIG. 7B is an illustration of a sectional view of an embodiment similar to FIG. 7A having a slower peripheral edge taper compared to existing silicone hydrogel contact lenses.
Figure 9:
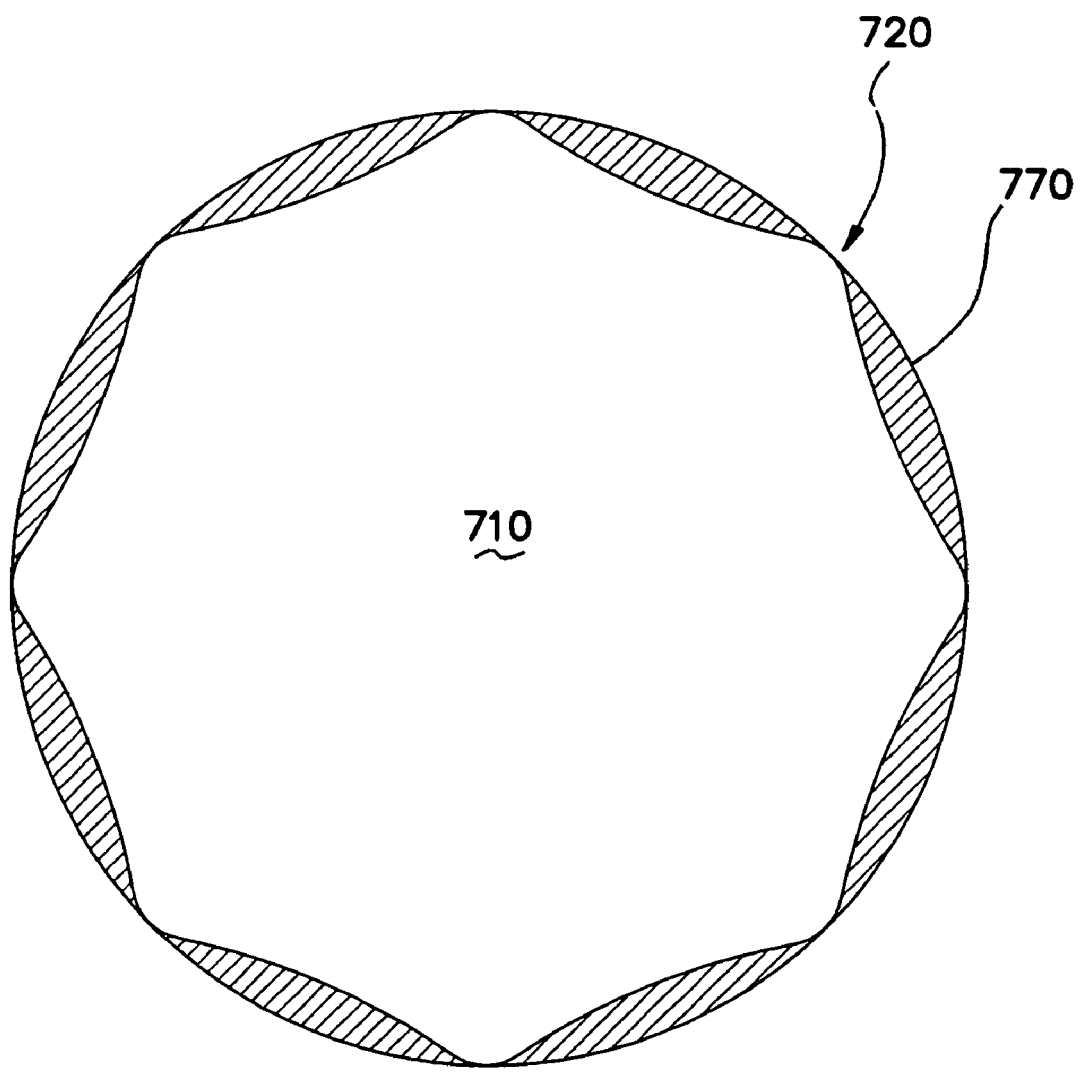
FIG. 9 is an illustration of a plan view of a contact lens comprising peripheral channels to reduce the contact area of the lens edge.

The present lenses are structured and are effective in reducing conjunctival pressure without compromising the initial comfort of the lens wearer. For example, the present lenses may have a decreased sagittal depth relative to existing silicone hydrogel contact lenses, as shown in FIG. 1. In addition or alternatively, the posterior surface of the lens may have a more than one curve, for example a bicurve surface, effective in increasing the edge lift over the conjunctiva, as shown in FIG. 2. As shown in FIG. 3, the lens may have a rounded edge, or a rounded posterior surface of the lens edge. In addition, or alternatively, the present lenses may have a reduced peripheral stiffness, for example, the present lenses may have a thinner edge region than existing silicone hydrogel contact lenses, as shown in FIG. 6. Or, the lenses may have a lens edge region with a slower taper of peripheral lens thickness (μm/mm), as shown in FIGS. 7A and 7B. In addition, or alternatively, the present lenses may comprise a lens edge region having a reduced conjunctival contact area relative to existing silicone hydrogel contact lenses. For example, the lens edge region may comprise a lifted region or a localized edge lift, as shown in FIGS. 8A and 8B. Or, the lens edge region, such as the posterior surface of the lens edge region may comprise one or more channels, such as microchannels, around the periphery of the lens edge region, as shown in FIG. 9. Additionally or alternatively, the present lenses may have an increased diameter relative to existing silicone hydrogel contact lenses. Furthermore, the present lenses may have altered material properties, surface friction, or tribology compared to existing silicone hydrogel contact lenses, such alterations being effective in reducing conjunctival pressure and interaction.

One effective method to reduce the pressure of the contact lens on the conjunctiva and eliminate the signs of conjunctival interaction is by altering the sagittal depth of the silicone hydrogel contact lens. For example, as shown in FIG. 1, the sagittal depth can be understood to be the distance between a central region 12 of the contact lens 10 and a surface 14 on which the lens 10 is placed. Sagittal depth measurements can be determined using any conventional technique and device, such as a JCB Optimec. For example, the sagittal depth of a contact lens can be defined as the vertical height of the lens from its center while placed concave surface down to the resting plane over the chord of the lens diameter. Or, the sagittal depth may be defined using either Equation I or Equation II below:

$$S=VH \qquad \text{Equation I}$$

$$S=R-(\text{square root of}(R^2-C^2)) \qquad \text{Equation II}$$

In Equation I, S refers to the sagittal depth, VH refers to the vertical height of the contact lens when placed on a flat surface with the outer peripheral edge or edge region contacting the flat surface.

In Equation II, S=sagittal depth, R=radius of curve, and C=half of the chord diameter. Equation II may be useful in calculating the sagittal depth for a lens body having a back surface of a constant radius.

Sagittal depth for certain lenses cannot be adequately described by the base curve and lens diameter because it does not provide any information about the shape of the back surface. Table 2 summarizes the relationship between the sagittal depth and central base curve of a contact lens having a spherical back surface.

TABLE 2

Relationship between Sagittal Depth and BCOR of a monocurve back surface.

| Lens No. | Measured BC (mm) | Measured LD (mm) | Sagittal Depth (mm) |
|---|---|---|---|
| 1 | 8.2 | 14.0 | 3.93 |
| 2 | 8.4 | 14.0 | 3.75 |
| 3 | 8.6 | 14.0 | 3.60 |
| 4 | 8.8 | 14.0 | 3.47 |
| 5 | 9.0 | 14.0 | 3.35 |
| 6 | 9.2 | 14.0 | 3.23 |

BC = basecurve;
LD = lens diameter

As shown in Table 2, as the basecurve increases, the sagittal depth decreases.

Table 3 shows how several existing silicone hydrogel contact lens designs having the same back central of zone radius or back central optic radius (BCOR) and overall lens diameter specifications do not provide the same sagittal depth because the back surface is not spherical in shape.

TABLE 3

Sagittal Depth and BCOR of a non-monocurve back surface.

| Lens No. | Measured BC (mm) | Measured LD (mm) | Sagittal Depth (mm) | Shape factor |
|---|---|---|---|---|
| 1 | 8.6 | 14.0 | 3.21 | 0.6 |
| 2 | 8.6 | 14.0 | 3.38 | 0.8 |
| 3 | 8.6 | 14.0 | 3.60 | 1.0 |
| 4 | 8.6 | 14.0 | 3.93 | 1.2 |
| 5 | 8.6 | 14.0 | 4.47 | 1.4 |

Table 4 lists the measured sagittal depths of various marketed silicone hydrogel contact lens products.

TABLE 4

Sagittal depth of various marketed silicone hydrogel products

| Lens Name | Labelled BC | Labelled LD | Measured BC | Measured LD | Sagittal Depth | Material Modulus (MPa) | Material Dk |
|---|---|---|---|---|---|---|---|
| FND | 8.4 | 13.8 | | | | 1.5 | 140 |
| | 8.6 | 13.8 | 8.64 | 13.88 | 3.50 | 1.5 | 140 |
| Purevision | 8.6 | 14.0 | 8.59 | 14.09 | 3.67 | 1.4 | 99 |
| O2 Optix | 8.6 | 14.2 | 8.61 | 14.31 | 3.83 | 1.0 | 110 |
| Advance* | 8.3 | 14.0 | 8.3 | 14.0 | 4.05 | 0.4 | 60 |
| | 8.7 | 14.0 | 8.7 | 14.0 | 3.78 | 0.4 | 60 |
| Oasys | 8.4 | 14.0 | 8.45 | 14.15 | 3.85 | 0.7 | 103 |

*Acuvue 2 data (same design . . . to confirm).
FND = Focus Night & Day

The sagittal depth of the present lenses can be optimized to provide less conjunctival interaction for given material properties, such as base curve, lens diameter, and modulus. The sagittal depth of embodiments of the present lenses is selected so as not to compromise the fitting of the lens on the wearer's eye, and not to compromise the lens wearer's comfort. A lens that does not have an appropriate fit relationship to the eye and the fit is too flat may cause the lens edge to lift in a small portion of the lens circumference. This is called 'fluting' and may occur intermittently with the blink.

Reference will now be made in detail to the presently illustrated embodiments of the invention, examples of which are illustrated in the accompanying drawings. Wherever possible, the same or similar reference numbers are used in the drawings and the description to refer to the same or like parts. It should be noted that the drawings are in simplified form and are not to precise scale. In reference to the disclosure herein, for purposes of convenience and clarity only, directional terms, such as, top, bottom, left, right, up, down, over, above, below, beneath, rear, front, backward, forward, distal, proximal, anterior, posterior, superior, inferior, temporal, and nasal are used with respect to the accompanying drawings. Such directional terms should not be construed to limit the scope of the invention in any manner.

Although the disclosure herein refers to certain illustrated embodiments, it is to be understood that these embodiments are presented by way of example and not by way of limitation. The intent of the following detailed description, although discussing exemplary embodiments, is to be construed to cover all modifications, alternatives, and equivalents of the embodiments as may fall within the spirit and scope of the invention as defined by the appended additional disclosure.

As shown in FIG. 1, a contact lens 10 comprises a lens body 11. The lens body 11 comprises a central region 12, which can include an optic zone of the contact lens. The lens body also comprises an anterior surface 16, a substantially opposing posterior surface 18, and a lens edge region 20, which includes a lens edge surface 22. The lens edge surface 22 contacts a peripheral region of the posterior surface 18 and a peripheral region of the anterior surface 16. The lens 10 is illustrated on a substantially flat surface 14. The sagittal depth is illustrated as the distance, such as maximum distance, between the central region 12 and the surface 14.

A contact lens 110 is illustrated in FIG. 2. Contact lens 110 is substantially similar to contact lens 10 illustrated in FIG. 1, where like parts are indicated by like numbers increased by 100. One difference between the contact lens 110 and the contact lens 10 is that contact lens 110 has a bicurve back surface, whereas the contact lens 10 has a monocurve back surface. In reference to FIG. 2, contact lens 110 is illustrated as comprising a posterior surface 118 which comprises a first region 124 having a first curvature, and a second region 126 circumscribing the first region, the second region having a second curvature that is different than the first curvature. For example, as shown in FIG. 2, the second region 126 has a flatter radius $r_2$, which is greater than the radius, $r_1$, of the first region 124. The radius, $r_1$, can be understood to be the back central of zone radius or back central optic radius (BCOR).

Figure 4:
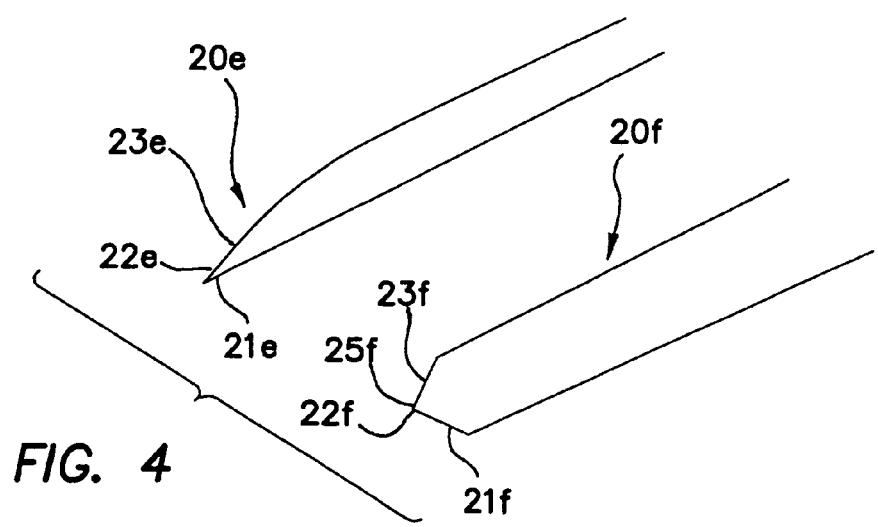
FIG. 4 is an illustration of sectional views of two contact lens edges having a knife-point edge (left lens) and a chisel edge (right lens).

Various lens edge regions 20a, 20b, 20c, 20d, 20e, and 20f, are shown in FIGS. 3 and 4. The lenses edges in FIG. 3 may be understood to be rounded lens edges. For example, the lens edge regions may include one or more rounded surfaces extending from the posterior surface of the contact lens toward the anterior surface. In certain embodiments, the lens edge region may comprise a rounded posterior surface, a rounded anterior surface, or a combination thereof. In certain embodiments, the lens edge region comprises a completely rounded lens edge surface. In other embodiments, the lens edge region may comprise a rounded posterior surface and a rounded anterior surface, and an intersection point between the rounded posterior surface and a rounded anterior surface.

In more detail, lens edge region 20a comprises a lens edge surface 22a. Lens edge surface 22a comprises a rounded posterior surface 21a and a rounded anterior surface 23a. The lens edge surface 22a is substantially continuous and may be understood to be a fully rounded lens edge.

Lens edge region 20b comprises a lens edge surface 22b. Lens edge surface 22b comprises a rounded posterior surface 21b, and a non-rounded or planar anterior surface 23b. The posterior surface 21b and the anterior surface 23b intersect at a point 25b. The lens edge 20b may be understood to be a chisel lens edge having a rounded posterior surface.

Lens edge region 20c comprises a lens edge surface 22c. Lens edge surface 22c comprises a rounded posterior surface 21c, and a non-rounded or planar anterior surface 23c. The posterior surface 21c and the anterior surface 23c intersect at a point 25c. The lens edge 20c may be understood to be a chisel lens edge having a rounded posterior surface. The chisel portion of the lens edge surface 22c is longer than the chisel surface of the lens edge surface 22b.

Lens edge region 20d comprises a lens edge surface 22d. Lens edge surface 22d comprises a rounded posterior surface 21d, and a rounded anterior surface 23d. The posterior surface 21d and the anterior surface 23d intersect at a point 25d. The lens edge 20d may be understood to be a rounded lens edge having an apex or intersection point.

As shown in FIG. 4, lens edge region 20e comprises a lens edge surface 22e. Lens edge surface 22e comprises a posterior surface 21e that has a curvature substantially similar to the posterior surface of the lens or a portion of the posterior surface, and a tapered anterior surface 23e which forms a sharp intersection point. Thus, lens edge region 20e is not a rounded edge. The lens edge region 20e may be understood to be a knife-point lens edge.

Lens edge region 20f comprises a lens edge surface 22f. Lens edge surface 22f comprises a non-rounded posterior surface 21f, and a non-rounded or planar anterior surface 23f. The posterior surface 21f and the anterior surface 23f intersect at a point 25f. The lens edge 20f may be understood to be a chisel lens edge.

The various lens edges shown in FIGS. 3 and 4 may be used in various embodiments of the present lenses. In certain embodiments of the present lenses, such as silicone hydrogel lenses, the lens edge region can include one or more rounded edge surfaces, including those illustrated in FIG. 3.

Figure 5:
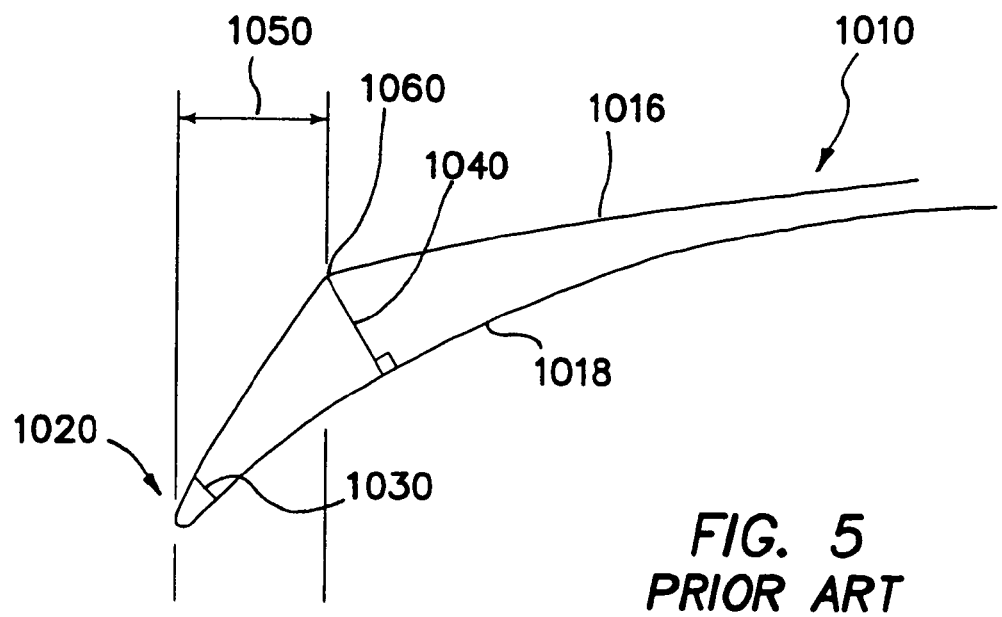
FIG. 5 is an illustration of a prior art contact lens edge showing a peripheral edge taper.

FIG. 5 illustrates the peripheral edge taper of a prior art silicone hydrogel contact lens 1010. The contact lens 1010 comprises a lens edge region 1020. A junction 1060 between the anterior surface 1016 and the lens edge region 1020 is shown. The junction thickness 1040 can be defined as the perpendicular distance between the posterior surface 1018 and the junction 1060. An edge thickness 1030 is shown in the lens edge region 1020. The width 1050 of the peripheral edge taper is shown as the distance between the peripheral edge of the lens and the junction 1060.

FIG. 6 illustrates an embodiment of the present contact lenses that has a reduced peripheral stiffness compared to existing silicone hydrogel contact lenses, such as the contact lens 1010 of FIG. 5. The stiffness for a region of a contact lens, such as a peripheral region, can be defined as the product of the Young's modulus of the lens and the square of the thickness of the lens at a specified region. As shown in FIG. 6, contact lens 210 comprises an anterior surface 216, a posterior surface 218, and a lens edge region 220. The peripheral edge taper is shown to be greater than the peripheral edge taper of the silicone hydrogel lens 1010. For example, the width 250 between the junction 260 and the lens edge is greater than the width 1050 of the prior art silicone hydrogel contact lenses. The junction thickness is illustrated at 240, and the edge thickness is illustrated at 230. In certain embodiments of the present silicone hydrogel contact lenses, the width 250 is greater than 1.2 mm. The width 250 may also be expressed in relative terms, such as a percentage of the lens diameter, or as a rate of change, for example, as a change in length over thickness of the lens, or as a change in length over the lens diameter. Thus, the peripheral edge region of the present conjunctival pressure reducing contact lenses can be thinner than the peripheral edge regions of prior art lenses. In other words, the rate of change in thickness from the junction 260 to the peripheral edge can be less than the rate of change observed in prior art silicone hydrogel lenses.

Another example of a slower peripheral edge taper is shown in FIGS. 7A and 7B. In FIG. 7A, a contact lens 310 comprises an anterior surface 316, a posterior surface 318, and a peripheral edge region 320. In FIG. 7B, a contact lens 410 comprises an anterior surface 416, a posterior surface 418, and a peripheral edge region 420. As shown in FIG. 7A, the anterior surface of the peripheral edge region can be curved, substantially junctionless, or entirely junctionless. In comparison, the contact lens 410 may comprise an anterior surface of the peripheral edge that includes one or more non-curved regions or surfaces, and may include one or more junctions. However, both embodiments include a peripheral edge region that have more than one rate of change in thickness. By reducing the thickness at the outer peripheral edge regions, the peripheral stiffness can be reduced, or the peripheral flexibility can be enhanced, to thereby reduce pressure on the conjunctiva when the lens is worn on an eye.

Certain embodiments of the present lenses can include a localized peripheral edge lift to reduce the contact area between the lens edge and the conjunctiva. As shown in the lens 510 of FIG. 8A, the lens comprises an anterior surface 516, a posterior surface 518, and a lens edge region 520. The lens edge region comprises a lens edge surface 522. The lens edge surface 522 comprises a posterior surface region 521 which is concave or curved towards the anterior surface 516. The lens edge surface 522 comprises an anterior surface region that is curved toward the posterior surface 518. By providing a concave surface 521 that curves away from the surface of the eye when placed thereon, it is possible to reduce the contact area between the lens edge and the conjunctiva of the eye, and obtain a desired localized edge lift.

As shown in the lens 610 of FIG. 8B, the lens comprises an anterior surface 616, a posterior surface 618, and a lens edge region 620. The lens edge region 620 comprises a lens edge surface 622. The lens edge surface 622 comprises a posterior surface region 621 that is convex. This may be similar to the rounded edge lenses illustrated in FIG. 3. The anterior surface region 623 is also rounded, and intersects the posterior surface region 621 at an apex. By rounding the lens edge as shown at 621, the apex or intersection of the anterior surface region 623 and the posterior surface region 621 is spaced apart from the conjunctiva and results in a reduced contact area and/or localized edge lift of the contact lens.

FIG. 9 illustrates another contact lens 710 that includes a peripheral edge region 720 that has a reduced contact area provided by a band of channels 770 located around the periphery of the lens.

One example of a silicone hydrogel contact lens with a reduced sagittal depth that showed reduced conjunctival staining was examined. This contact lens had a modulus of 1.0, a basecurve of 8.8 mm, a lens diameter of 14 mm, and a chisel edge, similar to that shown in FIG. 4. When compared to a similar contact lens having a modulus of 1.0, a basecurve of 8.5 mm, a lens diameter of 14 mm, and a chisel edge, less conjunctival staining was observed. In this example, it is demonstrated that reducing the sagittal depth decreases the conjunctival pressure as indicated by a reduced conjunctival staining.

Thus, at least one embodiment of the present lenses relates to silicone hydrogel contact lenses. The lenses can be spherical or aspherical lenses. Aspherical lenses may be rotationally stabilized silicone hydrogel contact lenses. In certain embodiments, the present lenses may include one or more regions with a substantially uniform horizontal thickness profile. For example, the present lenses may include one or more regions which comprise iso-thickness bands, lines, zones, and the like. The lenses may include a ballast, such as a prism ballast, a periballast, and the like. The lenses may also include one or more thin zones, such as thin zones that are superior and/or inferior to the optic zone of the contact lens. In addition, the present lenses may include a region of maximal thickness located at an inferior region of the lens, such as between the optic zone or a border region thereof, and the inferior edge of the contact lens. The present lenses may be monofocal or multifocal, including bifocal lenses. In addition, the present lenses may include one or more toric regions.

The present lenses can be designed using computer software. The materials used to form the lenses can be cured using conventional methods, including the use of ultraviolet radiation, and the like, such as thermal radiation, irradiation, chemical, and electromagnetic radiation. The materials may be placed in a contact lens mold, which can be produced by a mold insert in an injection molding apparatus. After forming the present lenses, they can be packaged in a sterile condition for use.

The present lenses can be placed on an eye of an individual in need thereof. The lens wearer can wear the present silicone hydrogel contact lenses for a period of time from about at least about one day to about 30 days or more. For example, the present lenses may be daily wear lenses, lenses suitable for overnight wear, and/or extended or continuous wear lenses. A person can wear the present lenses overnight, and upon examination, the lack of conjunctival flaps can be observed using the methods described herein. Lens wearers can report improved comfort with the present lenses compared to existing silicone hydrogel contact lenses.

In view of the disclosure herein, embodiments of the present lenses relate to spherical silicone hydrogel contact lenses that have a peripheral edge with at least one rounded edge surface, such as a posterior edge surface. Such lenses can have any modulus suitable for silicone hydrogel contact lenses. Such lenses can have a sagittal depth less than 3.65 mm.

Another embodiment of a spherical silicone hydrogel contact lens in accordance with the present disclosure comprises a non-rounded peripheral edge, a Dk (oxygen permeability) greater than 120, and a modulus greater than 1.1 MPa. In this embodiment, the sagittal depth can be less than 3.5. Another non-rounded edge embodiment of the present spherical silicone hydrogel contact lenses can have a Dk from about 70 to about 120, a modulus from about 0.4 to about 1.1 MPa, and a sagittal depth less than 3.8 mm, and in certain embodiments less than 3.75 mm. Another non-rounded edge embodiment of the present spherical silicone hydrogel contact lenses can have a Dk less than 70, any modulus suitable for silicone hydrogel contact lenses, and a sagittal depth less than 3.7.

Certain embodiments of the present spherical hydrogel contact lenses can have a posterior bicurve of any configuration, and a half chord diameter less than 1.5 mm measured from the lens edge.

Non-spherical silicone hydrogel contact lenses, such as toric contact lenses and multifocal contact lenses, can have peripheral edges with a rounded peripheral edge surface, any modulus suitable for silicone hydrogel contact lenses, and a sagittal depth less than 3.65.

Determination and values of lens properties, such as Dk, modulus, ionoflux, water content, and the like can be made using routine methods known by persons of ordinary skill in the art.

Although the disclosure herein refers to certain illustrated embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the additional disclosure.

A number of publications and patents have been cited hereinabove. Each of the cited publications and patents are hereby incorporated by reference in their entireties.

What is claimed is:

1. A contact lens, comprising:
a lens body comprising a design wherein a conjunctival pressure is reduced and the lens body is effective in reducing conjunctival epithelial flap occurrence.

2. The lens of claim 1, wherein the lens body comprises a silicone hydrogel material.

3. The lens of claim 1 which is a spheric or aspheric contact lens.

4. The lens of claim 1 which is a rotationally stabilized contact lens.

5. The lens of claim 1 which is a toric contact lens.

6. The lens of claim 1, wherein the lens body comprises a substantially uniform horizontal thickness.

7. The lens of claim 1, wherein the lens body comprises a peripheral edge region comprising a rounded edge surface.

8. The lens of claim 1, wherein the lens body has a sagittal depth effective in reducing the conjunctival pressure.

9. The lens of claim 1, wherein the lens body comprises a posterior surface having a bicurve surface.

10. The lens of claim 1, wherein the lens body comprises a peripheral edge having a contact area effective in reducing the conjunctival pressure.

11. The lens of claim 10, wherein the lens body comprises channels located near the lens edge.

12. The lens of claim 1, wherein the lens body comprises channels located near the lens edge.

13. A contact lens, comprising:
a lens body comprising a design wherein a conjunctival pressure is reduced and the lens body comprises a peripheral edge region having a greater flexibility than a more central region of the lens body.

14. The lens of claim 13, wherein the lens body comprises a silicone hydrogel material.

15. The lens of claim 13, wherein the lens body is effective in reducing conjunctival epithelial flap occurrence.

16. The lens of claim 13 which is a spheric or aspheric contact lens.

17. The lens of claim 13 which is a rotationally stabilized contact lens.

18. The lens of claim 13 which is a toric contact lens.

19. The lens of claim 13, wherein the lens body comprises a substantially uniform horizontal thickness.

20. The lens of claim 13, wherein the lens body comprises a peripheral edge region comprising a rounded edge surface.

21. The lens of claim 13, wherein the lens body has a reduced sagittal depth effective in reducing the conjunctival pressure.

22. The lens of claim 13, wherein the lens body comprises a posterior surface having a bicurve surface.

23. The lens of claim 13, wherein the lens body comprises a peripheral edge having a contact area effective in reducing the conjunctival pressure.

24. A contact lens, comprising:
a lens body comprising a design wherein a conjunctival pressure is reduced and the lens body is a spherical silicone hydrogel lens body comprising a peripheral edge with a rounded posterior edge surface, a modulus no greater than 1.5 MPa, and a sagittal depth less than 3.65 mm.

25. A contact lens, comprising:
a lens body comprising a design wherein a conjunctival pressure is reduced and the lens body is a spherical silicone hydrogel lens body comprising a non-rounded peripheral edge, an oxygen permeability greater than 120 barrers, a modulus greater than 1.1 MPa, and a sagittal depth less than 3.5 mm.

26. A contact lens, comprising:
a lens body comprising a design wherein a conjunctival pressure is reduced and the lens body is a spherical silicone hydrogel lens body comprising a non-rounded peripheral edge, an oxygen permeability from about 70 barrers to about 120 barrers, a modulus from about 0.4 MPa to about 1.1 MPa, and a sagittal depth less than 3.8 mm.

27. A contact lens, comprising:
a lens body comprising a design wherein a conjunctival pressure is reduced and the lens body is a spherical silicone hydrogel lens body comprising a non-rounded peripheral edge, an oxygen permeability less than 70 barrers, a modulus no greater than 1.5 MPa, and a sagittal depth less than 3.7 mm.

28. A contact lens, comprising:
a lens body comprising a design wherein a conjunctival pressure is reduced and the lens body is a spherical silicone hydrogel lens body comprising a bicurved posterior surface, a peripheral edge, and a half chord diameter less than 1.5 mm measured from the peripheral edge.

29. A contact lens, comprising:
a lens body comprising a design wherein a conjunctival pressure is reduced and the lens body is an aspherical silicone hydrogel lens body comprising a peripheral edge with a rounded peripheral edge surface, and a sagittal depth less than 3.65 mm.

30. A method of producing a contact lens, comprising designing the lens to have a reduced conjunctival pressure and to be effective in reducing conjunctival epithelial flap occurrence.

* * * * *